Dec. 5, 1961   J. W. GRAHAM   3,011,566
BEARING WEAR INDICATION FOR A ROLLER BIT
Filed Nov. 16, 1959
FIG. 1.
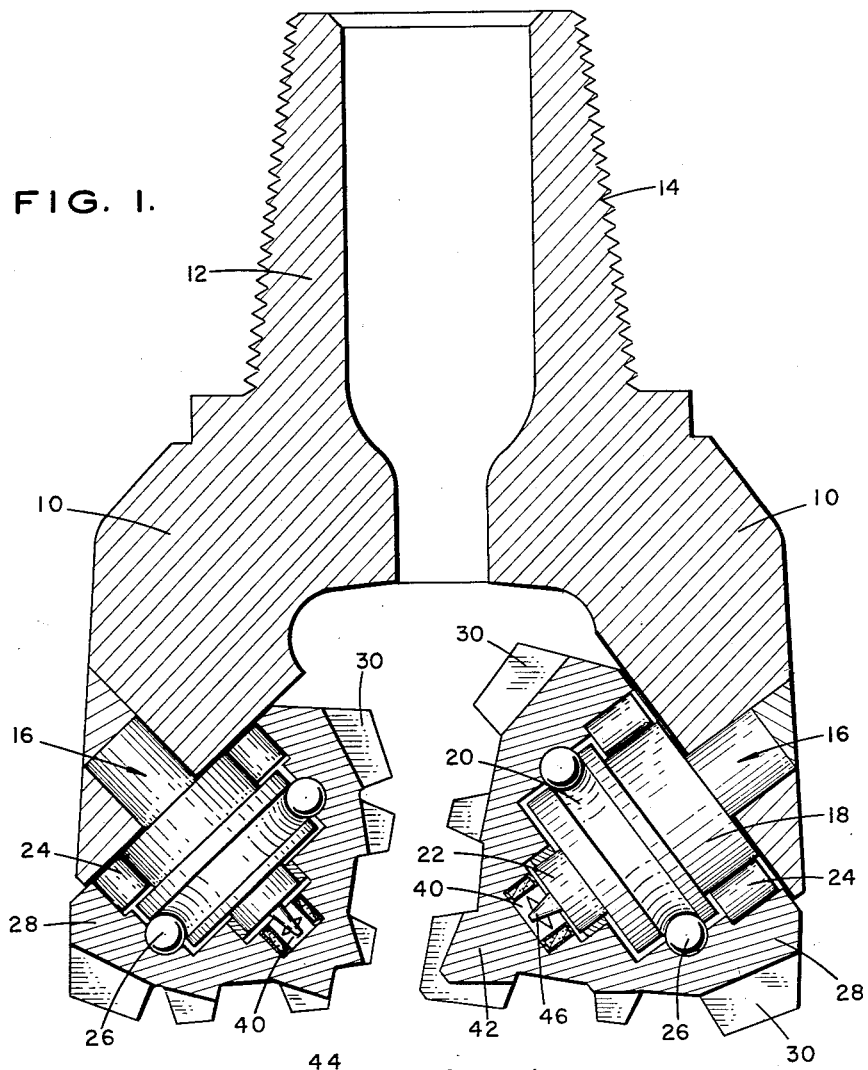
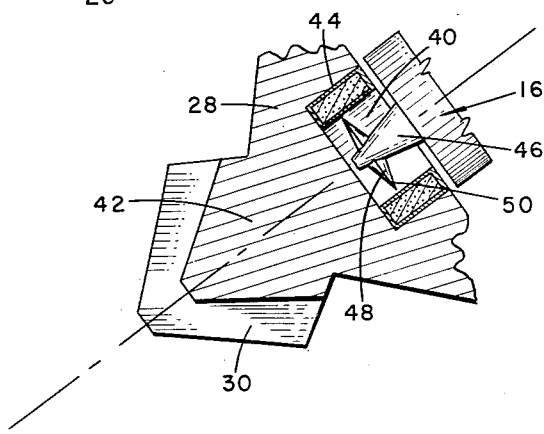
FIG. 2.
INVENTOR.
JOHN W. GRAHAM,
BY Frank S. Troidl
ATTORNEY.

3,011,566
BEARING WEAR INDICATION FOR A ROLLER BIT
John W. Graham, Bellaire, Tex., assignor, by mesne assignments, to Jersey Production Research Company, Tulsa, Okla., a corporation of Delaware
Filed Nov. 16, 1959, Ser. No. 853,271
2 Claims. (Cl. 175—39)

This invention relates to roller bits for deep well drilling. More particularly, this invention is an improved bit including structure therein which permits the indication of an excessive wearing of the roller bearings and ball bearings contained in the bit.

Conventional roller bits for the drilling of oil wells include a bit head in which are mounted roller cutters provided with teeth to penetrate the formation when the head is rotated by the usual drill stem. During drilling operations, a drilling fluid such as drilling mud is pumped downwardly through the drill stem and bit and rises upwardly in the space between the drill stem and the wall of the well to keep the cutters cool, to remove the cuttings, and to perform other functions well known to those skilled in the art.

During drilling operations, the cutting elements of the bit are subjected to great wear and tear. Often, the bearings in the bit sustain excessive wear resulting in the loss of one or more of the roller cutters along with their associated bearings. This requires fishing operations to find the lost parts. Usually, the only means of determining the amount of wear on the bearings is to remove the drill stem and its attached bit to the earth's surface. The bit is then examined.

This invention provides a bit from which the condition of the bearings of the roller bearing can be obtained while the bit is at the bottom of the borehole. This bit structure allows a maximum utilization of every bit without the concomitant danger of losing a roller cutter in the hole.

The invention as well as its many advantages will be further understood by reference to the following detailed description and drawings, in which:

FIG. 1 is a partly sectional elevation of a roller bit of the cone type; and

FIG. 2 is an enlarged sectional view of one means for indicating excessive wear of the bearings.

Referring to FIG. 1, the drill bit has bit legs 10 connected to a shank member 12 which is tapered upwardly and which has threads 14 thereon so that the drill bit can be engaged with a tool joint or drill collar (not shown) of a usual string of well drilling tools.

Shafts 16 which may be integral with the bit legs 10 extend downwardly from the bit legs 10 and inwardly toward the axis of the drill string. Shafts 16 are provided with roller bearing surfaces 18, ball bearing surfaces 20, and sleeve bearing surfaces 22.

Roller bearings 24 are mounted about the surfaces 18 of shafts 16. Ball bearings 26 are located in ball bearing raceways about the surfaces 20 of shafts 16. Roller cutters such as roller cones 28 having a plurality of cutting teeth 30 are mounted upon the shafts 16 for a rolling motion upon the roller bearings 24 and ball bearings 26. The roller cutters 28 are provided with surfaces which cooperate with the bearings 24 and 26.

When the bit is new or the bearings have not been worn excessively, the axis of the shafts 16 will be substantially the same axis as the axis of the roller bit cones 28. However, when the bearings become excessively worn, the roller bit cones 28 will be moved transversely to the axis of the shafts 16 or it will be rotated with respect to the axis of the shafts 16 causing the shaft axis to be different from the cone axis.

The portion of my new structure which indicates an excessive wear on the bearings 24 and 26 is shown in enlarged form in FIG. 2. A cylindrical chamber 40 coaxial with the axis of the cone 28 is provided adjacent the spearpoint 42. Lining the walls of the chamber 40 is a cylindrical metal capsule 44 which is filled with an easily detectable substance such as a mercaptan or a radioactive material.

A shaft extension pin 46 extends from the shaft 16 and is coaxial therewith. The shaft extension pin 46 has mounted thereon and preferably integral therewith an outwardly extending cutter member 48 having sharp cutting edges 50. The cutting edge 50 of cutting wheel 48 is normally spaced from the metal capsule 44.

When the bit is new, the axes of the pin extension 46 and the roller cutter 28 coincide. In this condition, the cutters 48 remain in the center of the cavity 40 and out of contact with the capsule 44.

When the bearing wear becomes excessive, the axes of the pin extension 46 and the cone 28 do not coincide. The cutter 48 ruptures the metal capsule 44. This releases the mercaptan or radioactive substance or other easily detectable substance from the capsule 44. The tracer substance within the capsule 44 is released into the well fluid and subsequently detected at the surface. The tracer material released into chamber 40 flows through the spaces provided between the inside of cone 28 and the shaft 16 outer surfaces. Thus, the tracer material flows around sleeve bearing surface 22, ball bearing surface 20, and roller bearing surface 18 into the mud stream. The drilling operation is stopped and the bit is withdrawn.

It is to be understood that various modifications can be made to the specific embodiment of the invention shown and described. For example, the cavity 40 could be located at places in the cone 28 other than in the spearpoint 42 with a cutting member provided to release the tracer material when the axis of the cone and the axis of the shaft do not coincide.

I claim:

1. A bit comprising: a bit leg; a shaft extending downwardly and inwardly from the bit leg; roller bearings mounted about the shaft; a roller cutter rotatably mounted upon the shaft and bearings with the axes of the roller cutter and shaft substantially coinciding, said roller cutter having a coaxial cylindrical chamber formed therein; a cylindrical member for confining a tracer material mounted within said chamber; a tracer material confined within said cylindrical member; and a cutting member extending from said shaft into the cylindrical chamber, said cutting member being responsive to a change of the axis of the roller cutter with respect to the axis of the shaft caused by excessive wear on the roller bearings, to cut the cylindrical member to release the tracer material; and a passageway leading from the cylindrical member to the exterior of the roller cutter.

2. A bit comprising: a bit leg; a shaft extending downwardly and inwardly from the bit leg; roller bearings mounted about the shaft; a roller cutter rotatably mounted upon the shaft and bearings with the axes of the roller cutter and shaft substantially coinciding; confining means within the roller cutter for confining a tracer material and having a frangible portion facing the shaft; a tracer material confined within said confining means; and a cutting member on the shaft, responsive to a change of the axis of the roller cutter with respect to the axis of the shaft caused by excessive wear on the roller bearings to break the frangible portion of the confining means to release the confined tracer material; and a passageway leading from the confining means to the exterior of the roller cutter.

References Cited in the file of this patent

UNITED STATES PATENTS

| | | |
|---|---|---|
| 1,662,901 | Ripley | Mar. 20, 1928 |
| 2,468,905 | Warren | May 3, 1949 |
| 2,658,724 | Arps | Nov. 10, 1953 |